(12) United States Patent
Thomas

(10) Patent No.: US 8,740,307 B1
(45) Date of Patent: Jun. 3, 2014

(54) NECK SUPPORTING ASSEMBLY

(76) Inventor: Mathai A. Thomas, Murphy, TX (US)

( * ) Notice: Subject to any disclaimer, the term of this patent is extended or adjusted under 35 U.S.C. 154(b) by 291 days.

(21) Appl. No.: 13/186,928

(22) Filed: Jul. 20, 2011

(51) Int. Cl.
*A47C 7/36* (2006.01)

(52) U.S. Cl.
USPC ........................ 297/397; 297/353; 297/230.14

(58) Field of Classification Search
USPC ................... 297/353, 230.1, 230.11, 230.12, 297/230.13, 230.14, 397, 410
See application file for complete search history.

(56) References Cited

U.S. PATENT DOCUMENTS

| | | | | |
|---|---|---|---|---|
| 225,432 A | * | 3/1880 | Starr | 297/353 |
| 1,756,210 A | * | 4/1930 | Racz | 248/408 |
| 2,060,298 A | * | 11/1936 | Gailey | 297/230.13 |
| 2,557,874 A | * | 6/1951 | Kailenta | 297/256 |
| 2,568,988 A | * | 9/1951 | Childs | 297/344.26 |
| 2,632,497 A | * | 3/1953 | Brady | 297/230.11 |
| 3,014,761 A | * | 12/1961 | Otto | 297/230.12 |
| 4,097,087 A | * | 6/1978 | Garavaglia | 297/284.7 |
| 4,862,536 A | * | 9/1989 | Pruit | 297/284.5 |
| 5,015,036 A | * | 5/1991 | Fergie | 297/397 |
| 5,335,965 A | * | 8/1994 | Sessini | 297/284.4 |
| 5,345,633 A | | 9/1994 | Harnish | |
| 5,454,623 A | * | 10/1995 | Parks | 297/230.1 |
| 5,964,504 A | * | 10/1999 | Hogan et al. | 297/397 |
| 6,435,617 B1 | | 8/2002 | McNair | |
| 6,527,339 B2 | * | 3/2003 | Voris | 297/219.12 |
| 6,957,867 B1 | * | 10/2005 | Su | 297/411.36 |
| D564,807 S | | 3/2008 | Da Re | |
| 7,637,568 B2 | * | 12/2009 | Meeker et al. | 297/250.1 |
| 7,703,849 B2 | * | 4/2010 | Bilak et al. | 297/284.6 |
| 8,459,737 B2 | * | 6/2013 | Brotsch | 297/230.1 |
| 2001/0040401 A1 | * | 11/2001 | Lin | 297/397 |
| 2002/0152553 A1 | | 10/2002 | Wynveen | |
| 2006/0250015 A1 | * | 11/2006 | Buck | 297/397 |
| 2009/0058161 A1 | * | 3/2009 | Meert | 297/397 |
| 2011/0001341 A1 | * | 1/2011 | Jorgensen | 297/230.1 |
| 2011/0031790 A1 | * | 2/2011 | Smith, Sr. | 297/230.12 |
| 2011/0095586 A1 | * | 4/2011 | Fernandez | 297/344.18 |

* cited by examiner

*Primary Examiner* — David R Dunn
*Assistant Examiner* — Alexander Harrison

(57) ABSTRACT

A neck supporting assembly includes a panel that has a front side, a back side, an upper edge, a lower edge, a first lateral edge and a second lateral edge. A coupler is attached to the panel and is removably coupled to the backrest. A neck support is provided and a connecting member releasably couples the neck support to the front side between the first and second lateral edges so that the neck support can support a person's neck.

1 Claim, 4 Drawing Sheets

NECK SUPPORTING ASSEMBLY

BACKGROUND OF THE DISCLOSURE

1. Field of the Disclosure

The disclosure relates to neck support devices and more particularly pertains to a new neck support device for providing a cushion that is abutted against a person's neck while the person is seated in a vehicle chair to prevent strain on the neck.

2. Summary of the Disclosure

An embodiment of the disclosure meets the needs presented above by generally comprising a panel that has a front side, a back side, an upper edge, a lower edge, a first lateral edge and a second lateral edge. A coupler is attached to the panel and is removably coupled to the backrest. A neck support is provided and a connecting member releasably couples the neck support to the front side between the first and second lateral edges so that the neck support can support a person's neck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
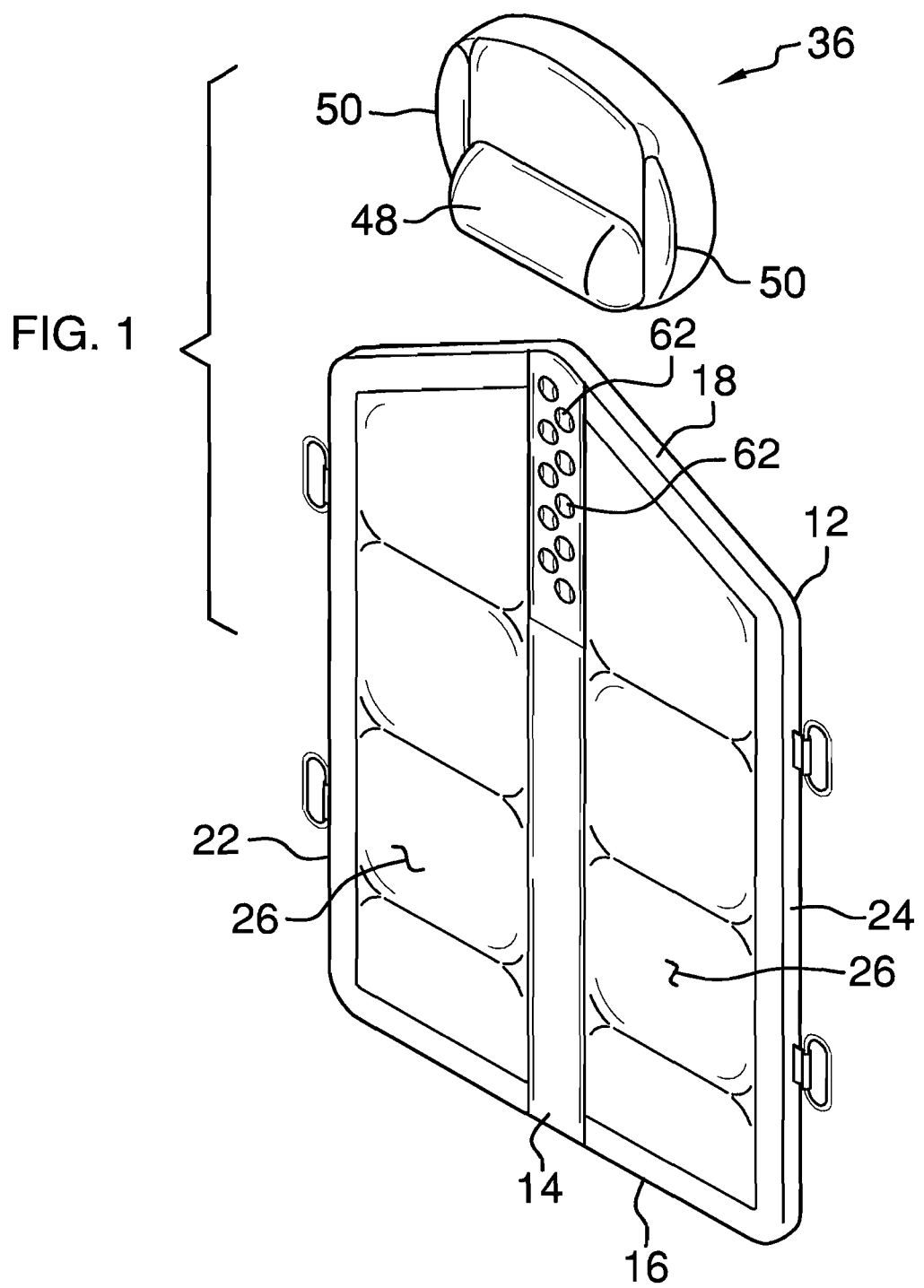
FIG. 1 is a front perspective view of a neck supporting assembly according to an embodiment of the disclosure.

With reference now to the drawings, and in particular to FIGS. 1 through 6 thereof, a new neck support device embodying the principles and concepts of an embodiment of the disclosure and generally designated by the reference numeral 10 will be described.

As best illustrated in FIGS. 1 through 6, the neck supporting assembly 10 generally comprises a panel 12 that has a front side 14, a back side 16, an upper edge 18, a lower edge 20, a first lateral edge 22 and a second lateral edge 24. The front side 14 has resiliently compressible padding 26 attached thereto and in particular is covered at least 70% with the padding 26.

Figure 2:
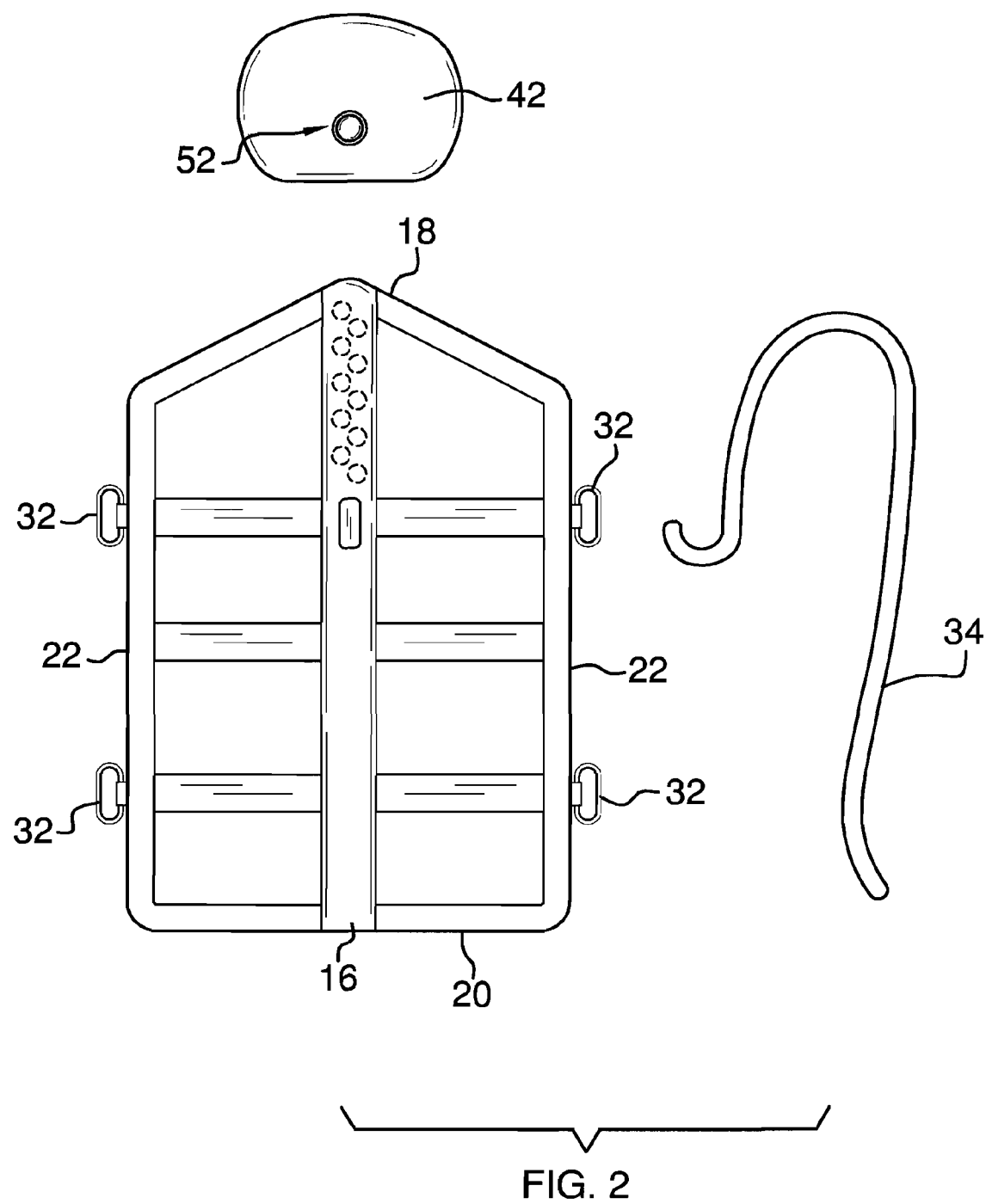
FIG. 2 is a rear view of an embodiment of the disclosure.
Figure 3:
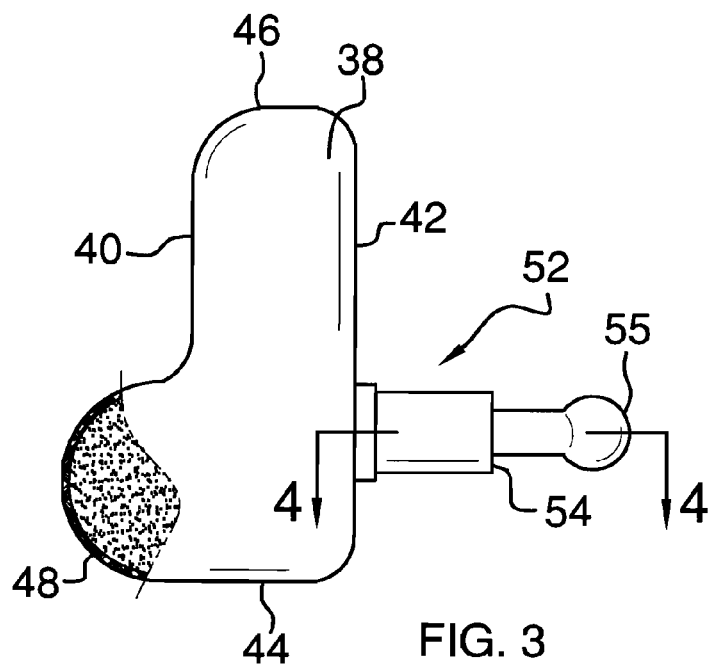
FIG. 3 is a broken side view of a neck support an embodiment of the disclosure.
Figure 4:
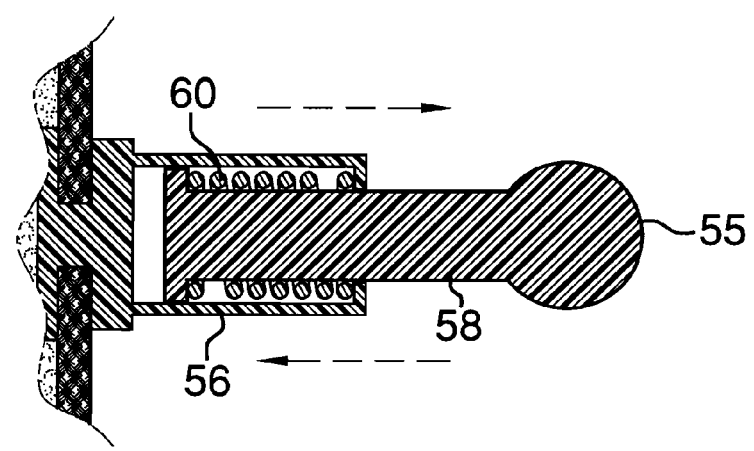
FIG. 4 is a cross-sectional view of an embodiment of the disclosure taken along line 4-4 of FIG. 3.
Figure 5:
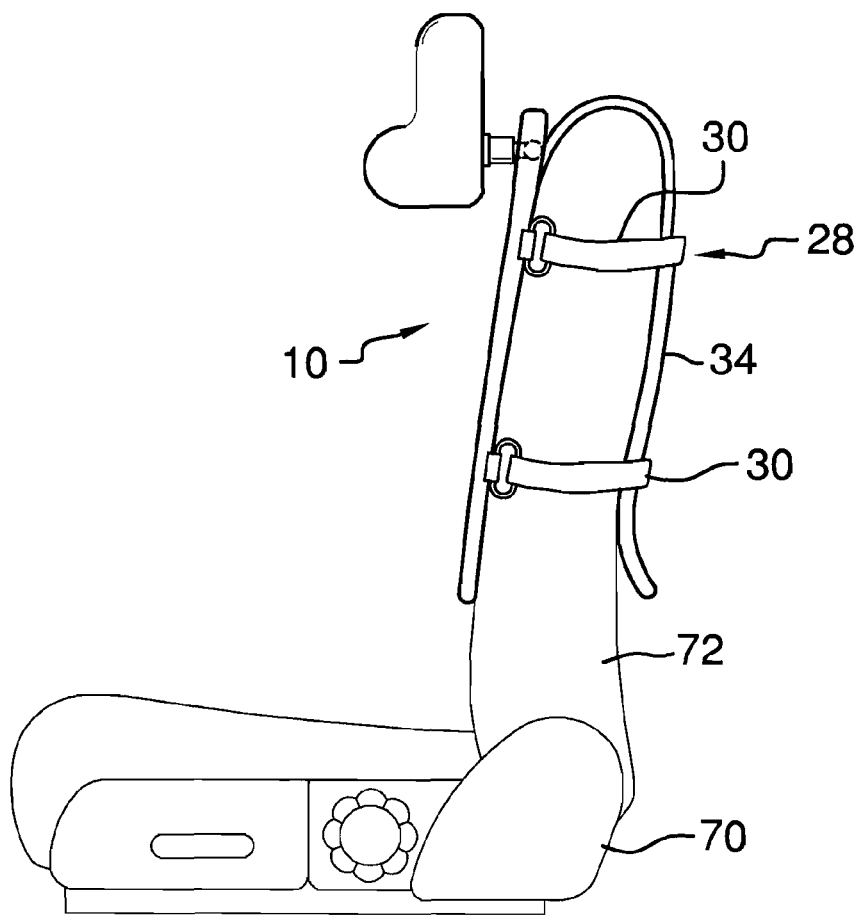
FIG. 5 is a side view of an embodiment of the disclosure.

A coupler 28 is attached to the panel 12 and is configured to removably couple the panel 12 to a backrest 72 of a vehicle chair 70. The coupler 28 includes a plurality of straps 30 attached to the panel 12 and which are extendable around the backrest 72. The straps 30 may be attached to hooks 32 mounted on the first 22 and second 24 lateral edges or to the back side 16 of the panel 12. As can be seen in FIGS. 2 and 5, a rigid harness 34 may be attached to the back side 16 of the panel 12 and extended over the backrest 72.

A neck support 36 is provided which is utilized instead of the head support 74 which would have been conventionally provided with the backrest 72. The neck support 36 includes a primary cushion 38 that has a first side 40, a second side 42, a bottom side 44 and a top side 46. The primary cushion 38 is comprised of a resiliently compressible material. A secondary cushion 48 is attached to the first side 40 adjacent to the bottom side 44 and spaced from the top side 46. The secondary cushion 48 is laterally elongated and is also comprised of a resiliently compressible material. The neck support 36 may include outside edges 50, between with the secondary cushion 48 extends, that are adjustable to cup a person's head. Additionally, the neck support 36 may be covered with a removable cover, not shown, to allow it to be removed for cleaning as needed.

A connecting member 52 releasably couples the neck support 36 to the front side 14 between the first 22 and second 24 lateral edges. The connecting member 52 is attached to the second side 42 of the primary cushion 38. The connecting member 52 includes a rod 54 that has a distal end 55 with respect to the neck support. The rod 54 extends into the front side 16 of the panel 12. The rod 54 is selectively spaced from the upper edge 18 to allow repositioning of the neck support 36 on the panel 12. The rod 54 may includes a sleeve 56 that is attached to the primary cushion 38. A post 58 is positioned in the sleeve 56. The post 58 includes the distal end 55 and is biased outwardly of the sleeve, such as with a spring 60. This provides additional cushioning for the user of the assembly 10. The connecting member 52 may be movably coupled to the neck support 36 to allow the positioning of the neck support 36 to be adjusted as needed. One way this may be accomplished is by having the distal end 55 comprise a bulbous member that is removably extended into and frictionally engaged with one of a plurality of apertures 62 in the front side 16.

Figure 6:
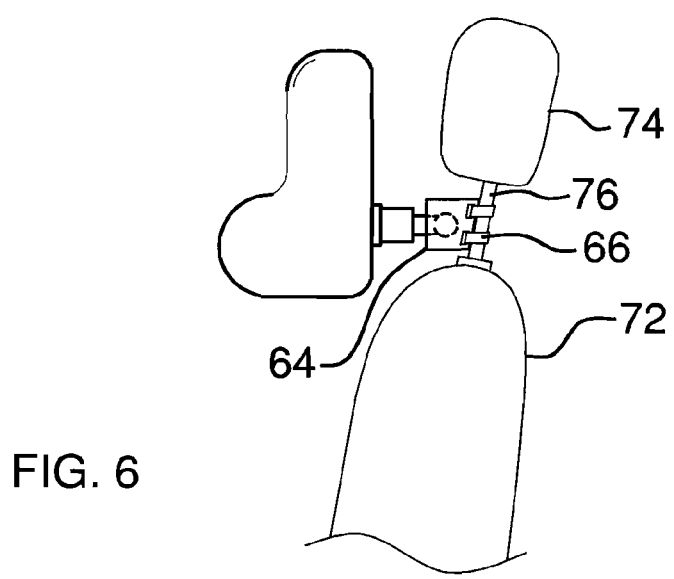
FIG. 6 is a side view of an embodiment of the disclosure.

Another embodiment is found in FIG. 6 and includes the connecting member 52 being attached to a mount 64 that is coupled to a support 76 of a headrest 74 by either a bracket 64 or strapping 66. This allows the neck support 36 to be utilized without the panel 12.

In use, the neck support 36 is placed where needed in relation to the backrest 12 to ensure that the person seated in the chair 70 will have their neck positioned against the secondary cushion 48. The secondary cushion 48 extends outwardly from the first side 40 a distance greater than one inch. This ensures that the user's neck itself will be supported to inhibit strain on the neck.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A neck bracing assembly configured to be mounted on a backrest of a vehicle chair, said assembly comprising:
    a panel having a front side, a back side, an upper edge, a lower edge, a first lateral edge and a second lateral edge, said front side having resiliently compressible padding attached thereto;
    a coupler being attached to said panel and being configured to removably couple said panel to the backrest, said coupler including a plurality of straps being attached to said panel and being extendable around the backrest;
    a neck support including;
        a primary cushion having a first side, a second side, a bottom side and a top side, said primary cushion being comprised of a resiliently compressible material;
        a secondary cushion being attached to said first side adjacent to said bottom side and spaced from said top side, said secondary cushion being laterally elongated, said secondary cushion being comprised of a resiliently compressible material;
    a connecting member releasably coupling said neck support to said front side between said first and second lateral edges, said connecting member being attached to said second side of said primary cushion, said connecting member including a rod having a distal end with respect to said neck support, said rod extending into said front side of said panel, said rod being selectively spaced from said upper edge to allow repositioning of said neck support on said panel, said rod including;
    a sleeve being attached to said primary cushion; and
    a post being positioned in said sleeve, said post including said distal end, said post being biased outwardly of said sleeve, said distal end comprising a bulbous member being extended into and frictionally engaged with one of a plurality of apertures in said front side.

\* \* \* \* \*